Sept. 21, 1965 M. TELKES ETAL 3,206,892
COLLAPSIBLE COLD FRAME
Filed May 24, 1960 7 Sheets-Sheet 1
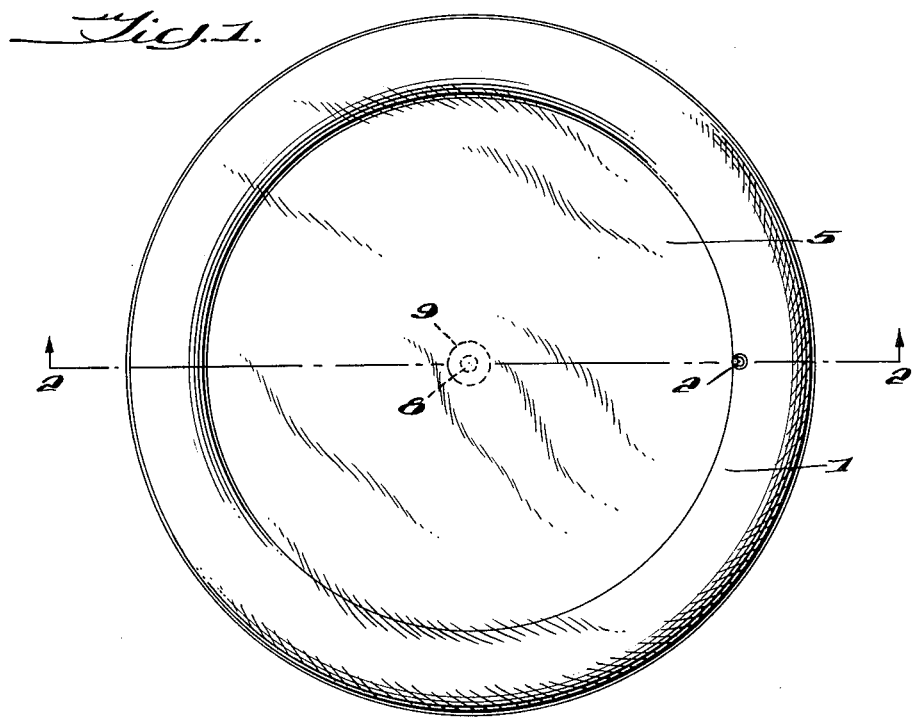
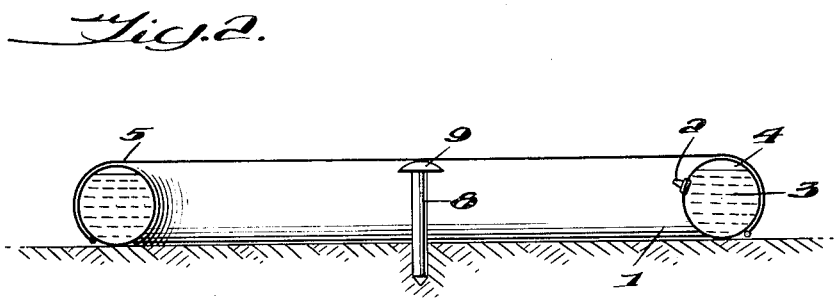
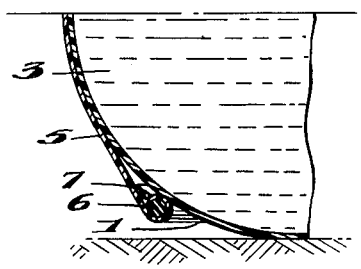
INVENTORS
MARIA TELKES,
STELLA ANDRASSY,
BY
ATTORNEY Sept. 21, 1965 M. TELKES ETAL 3,206,892
COLLAPSIBLE COLD FRAME
Filed May 24, 1960 7 Sheets-Sheet 2
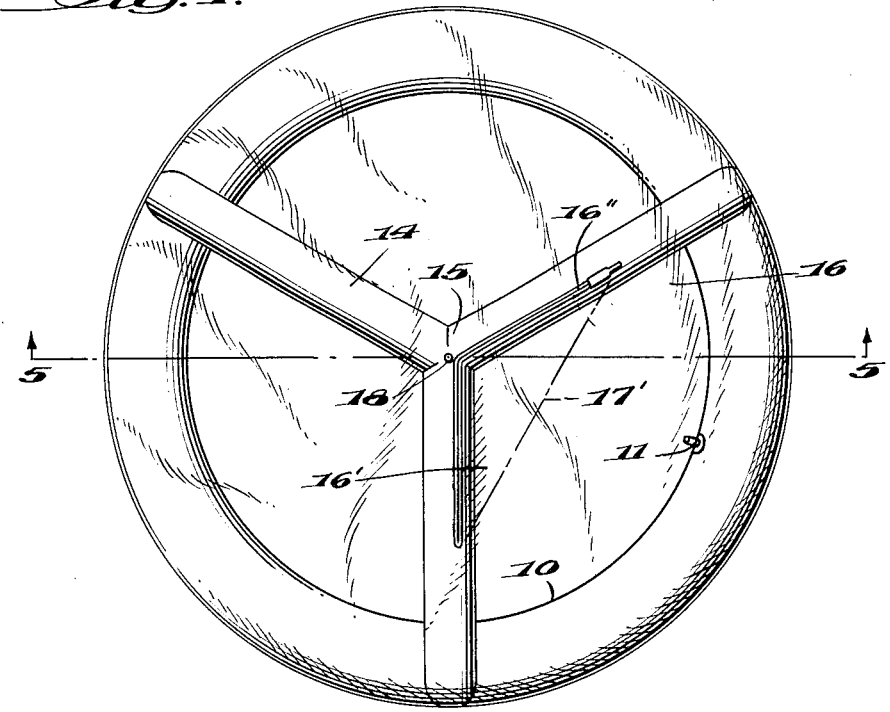
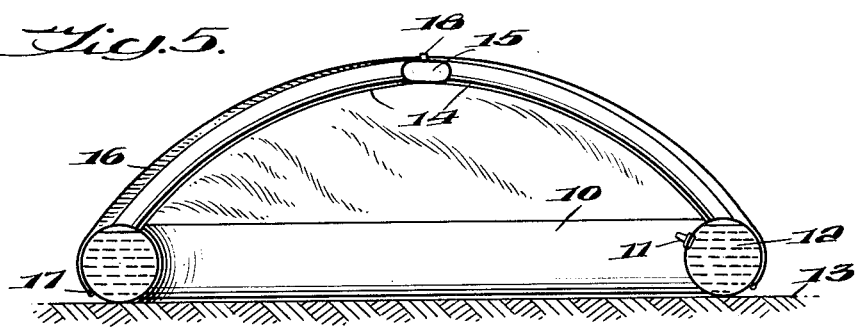
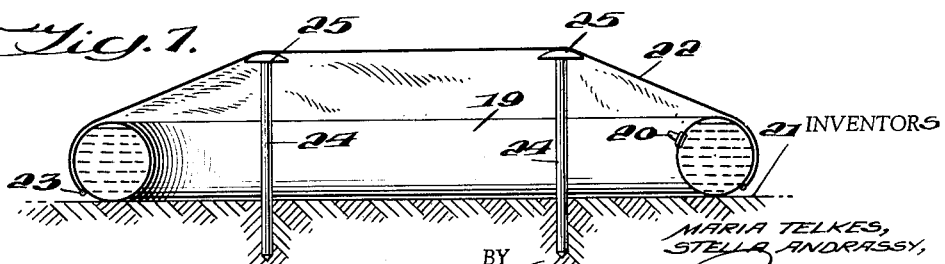
INVENTORS
MARIA TELKES,
STELLA ANDRASSY,
BY
ATTORNEY Sept. 21, 1965  M. TELKES ETAL  3,206,892
COLLAPSIBLE COLD FRAME
Filed May 24, 1960  7 Sheets-Sheet 3
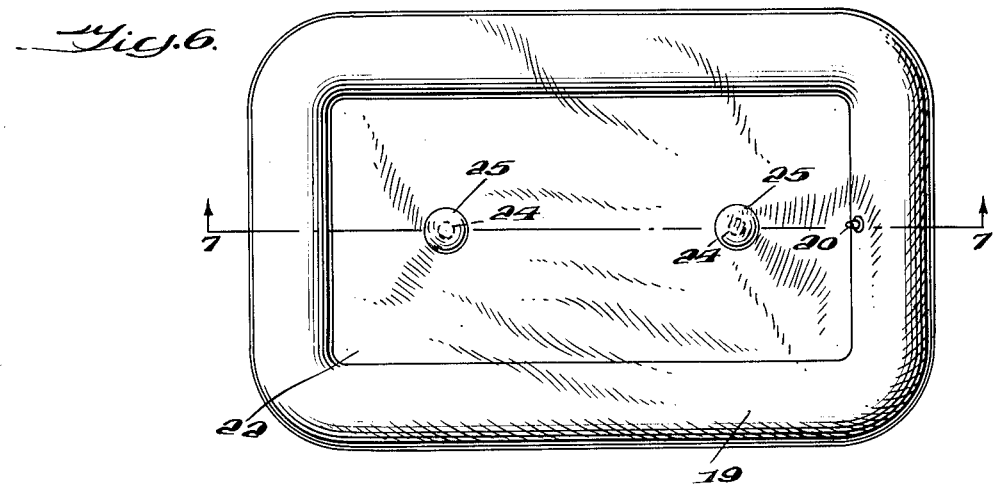
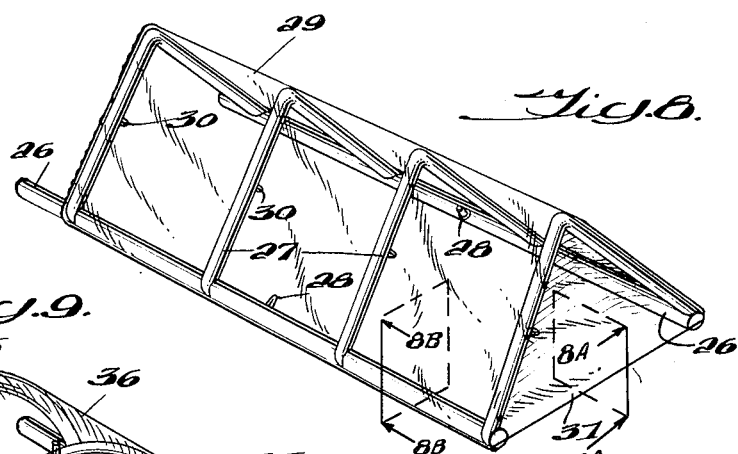
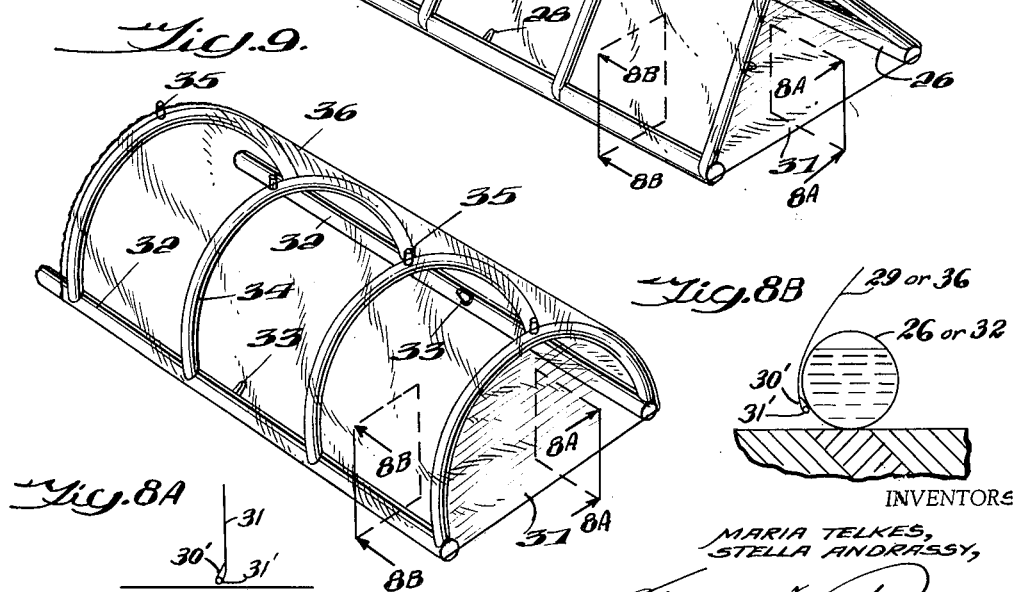
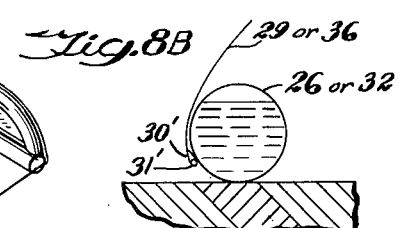
INVENTORS
MARIA TELKES,
STELLA ANDRASSY,
BY
ATTORNEY Sept. 21, 1965  M. TELKES ETAL  3,206,892
COLLAPSIBLE COLD FRAME
Filed May 24, 1960  7 Sheets-Sheet 5
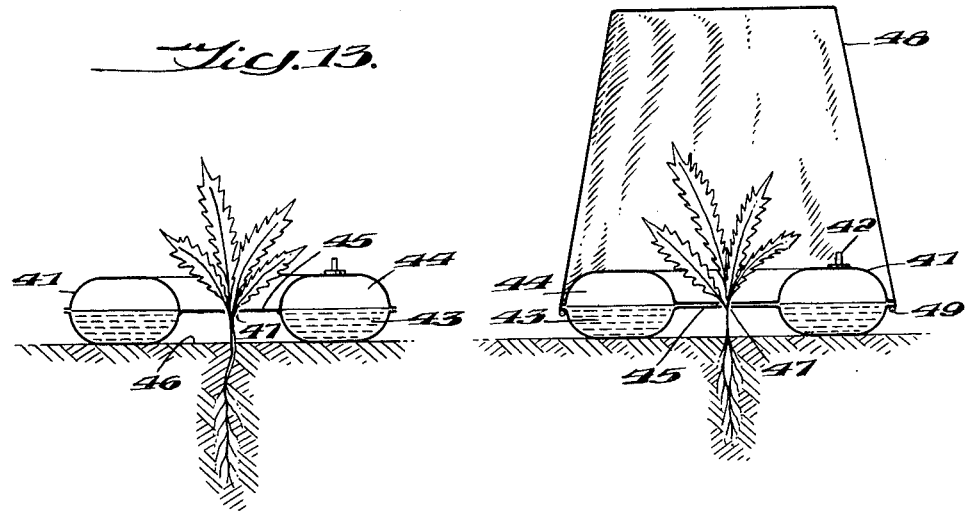
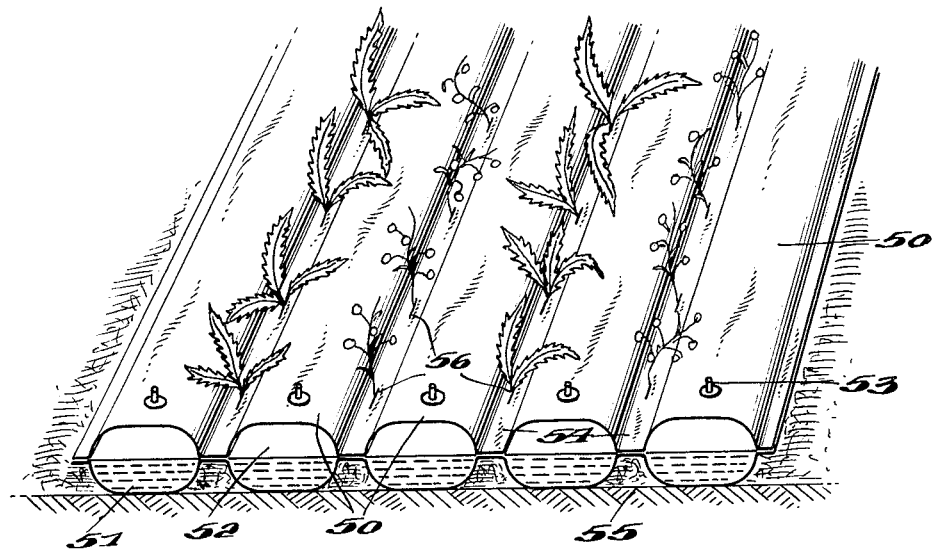
INVENTORS
MARIA TELKES,
STELLA ANDRASSY,
BY
ATTORNEY

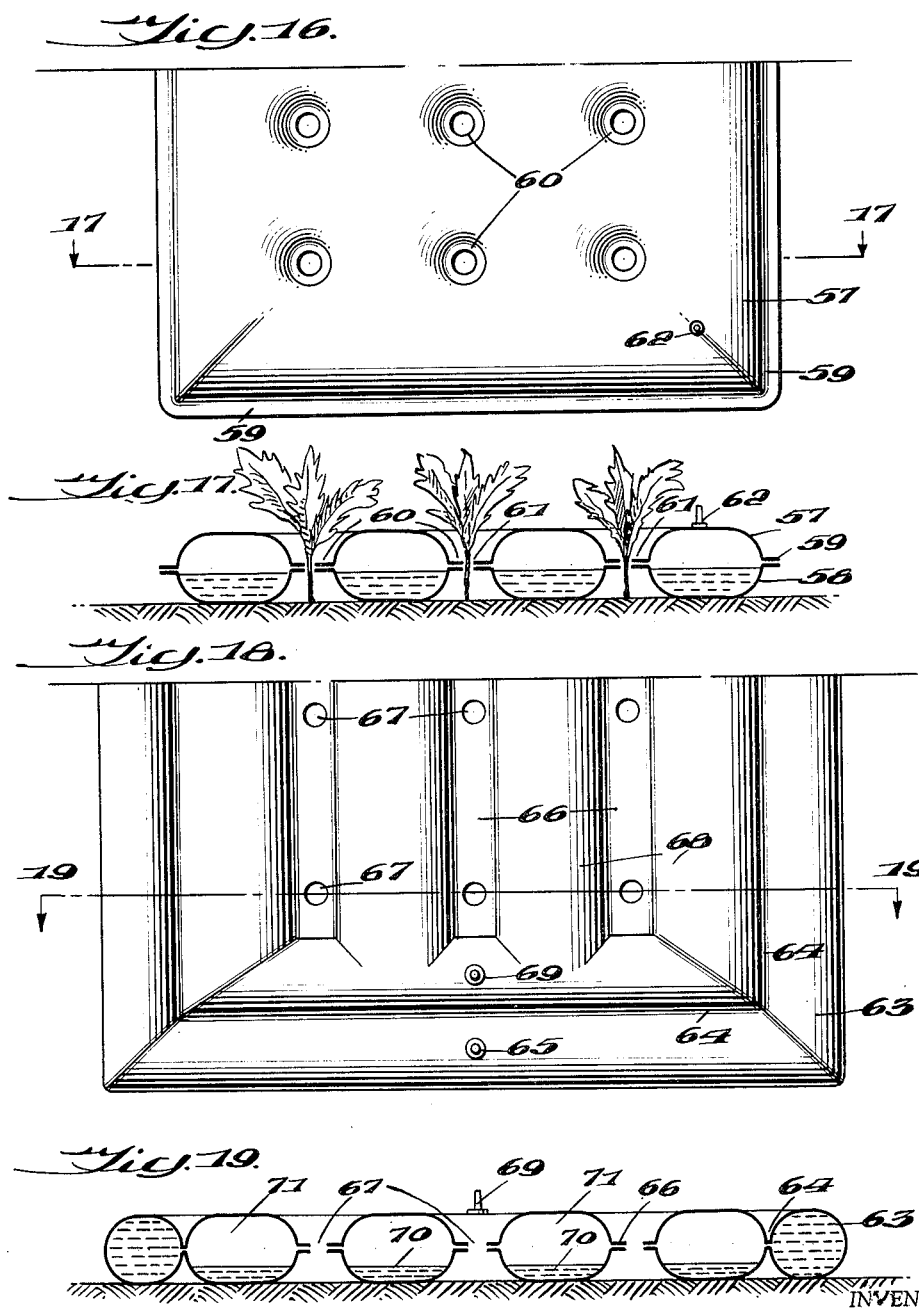

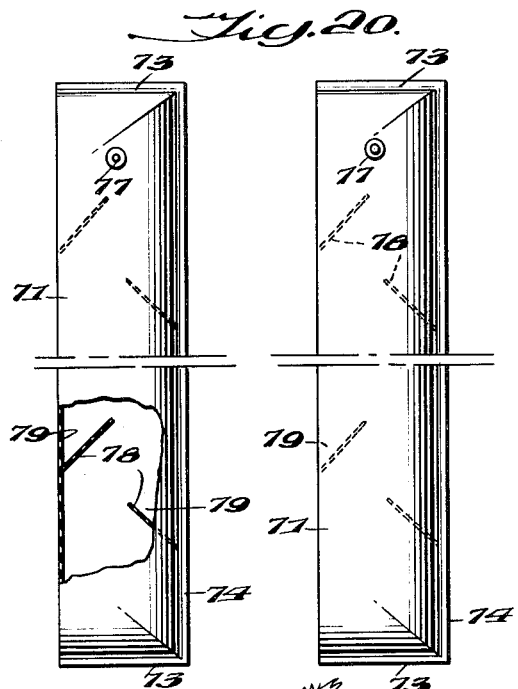
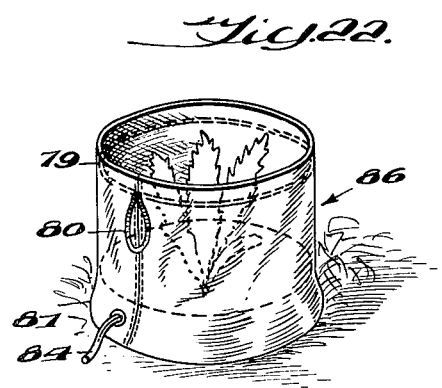
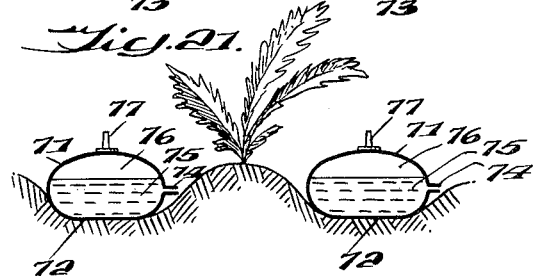
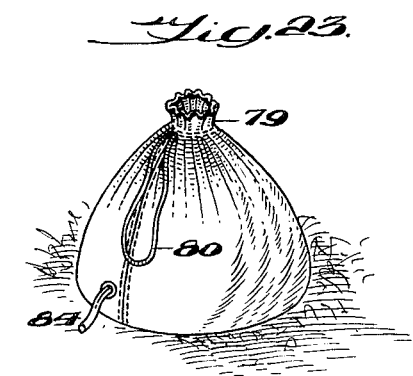
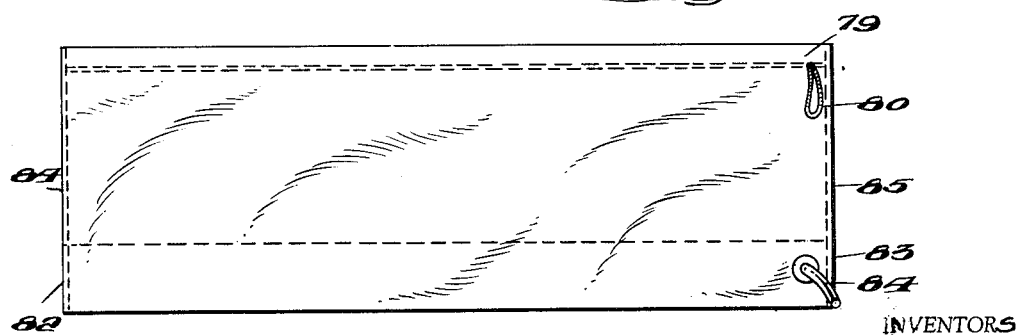
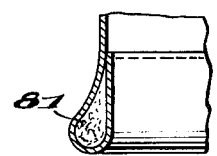

United States Patent Office 3,206,892
Patented Sept. 21, 1965

3,206,892
COLLAPSIBLE COLD FRAME
Maria Telkes, Princeton, and Stella Andrassy, Kingston, N.J., assignors to The Dow Chemical Company, Midland, Mich., a corporation of Delaware
Filed May 24, 1960, Ser. No. 31,476
1 Claim. (Cl. 47—29)

This invention relates to cold frames or sun mulches, and particularly to collapsible cold frames and sun mulches which are adapted to provide for the desired passage of light and infrared rays for the propagation and stimulation of plant growth and also for the the retention of heat in soil covered by the cold frame, together with improved facilities for controlling the humidity and temperature in the atmosphere within the cold frame.

Cold frames have long been used in order to propagate seedlings for transplanting as regular crop-producing or flowering plants in order to hasten the growth of such plants and for stimulating individual plant growth. It is well known that the temperature and humidity within a cold frame can be regulated much more closely than is obtainable by reliance upon nature, and that the growing season may be advanced by several weeks by the use of cold frames or sun mulches in the early spring.

It is also well known that one of the most critical periods in the life of a plant occurs when it is transplanted. Such replanting necessarily results in injury or destruction to a large percentage of the root system of a plant and it is usually very important that such transplants be supplied with adequate humidity and protection from the elements until the root system is reestablished.

According to the present invention, a collapsible cold frame or sun mulch is provided including a collapsible ballast tube which is adapted to be inflated, at least in part, with water and generally also partially inflated with air. This ballast tube is formed of a material, such as transparent plastic, which is highly transmissive of light and short wave infrared radiations. The ballast tube is adapted to be placed upon a surface of the ground, so that its contours substantially define a boundary or perimeter of the cold frame on the supporting ground surface and provides for readily locating the cold frame in any convenient place and, by its weight, anchoring it in the chosen position.

The water in the tube also serves a dual thermal purpose in that it permits the passage of incident solar infrared radiations, so that the ground under the ballast tube becomes heated by the rays of the sun, and the water also traps long wave infrared heat radiations which tend to pass out of the earth during the cooler portions of the day and the night, thereby maintaining a more even temperature of the earth under the ballast tube and within the cold frame.

The air within the ballast tube above the water serves as an insulating air space which further retards the passage of heat through the ballast tube and out of the cold frame during the cooler portions of the day and during the night.

In order further to moderate the temperature of the soil within the cold frame and protect plants which may be growing therein, a suitable covering member may be arranged to extend between and cover the space enclosed by the inflatable portions of the ballast tube. This covering member may be held in various ways in spaced relation from the side of the ballast tube which is adapted to engage the surface of the earth, so as to provide a space between the surface of the earth and the covering member within which warm air and moisture are enclosed.

The covering member may also comprise light and infrared transmissive material, or, if shading is required, the covering member may be of a translucent or opaque material. Furthermore, the covering member may be integral with the collapsible ballast tube or may be a separate member having means for securing it to the ballast tube. Replaceable covering members of this latter type have the advantage that a shading type covering member may be used during part of the growing period and a transparent covering member may be used for another part of the growing period.

In some instances, it may be found desirable also to provide supports for the covering member to assure against weighting down of the covering member by precipitation of water, sleet, or snow, and possible consequent damage to plants growing within the cold frame. Such supports can take various forms, such as rigid tent posts or pegs placed within the cold frame at spaced intervals, or may be conveniently formed of collapsible inflatable ribs secured to the ballast tubes and extending upwardly away from the surfaces of the tubes which are adapted to engage the ground surface.

An object of this invention is to provide an improved cold frame.

Another object of this invention is to provide an improved collapsible cold frame or sun mulch.

A further object of this invention is to provide an improved collapsible cold frame structure having a ballast tube which is highly transmissive of light and short wave infrared radiations and is adapted to be inflated, in part at least, with water, so as to anchor the cold frame in position and to assist in warming earth beneath the cold frame and moderate the temperature of the air enclosed by the cold frame.

Yet another object of this invention is to provide an improved cold frame of the collapsible type which may be readily set up in any desired location without the need of structural foundations, and which can be used for the propagation of crops in situ, for advancing their initial growth, and materially reducing the need for weeding crops during the early stages of growth.

Further objects and advantages of this invention will become apparent from the following description, referring to the accompanying drawings, and the features of novelty which characterize this invention will be pointed out with particularity in the claims appended to and forming a part of this specification.

In the drawings:

FIG. 1 is a plan view of one embodiment of an improved collapsible cold frame or sun mulch made in accordance with the present invention, provided with a removable covering member;

FIG. 2 is a sectional elevational view, taken along line 2—2 of the collapsible cold frame shown in FIG. 1;

FIG. 3 is an enlarged sectional view of the lower outer portion of the cold frame shown in FIG. 2;

FIG. 4 is a plan view of another embodiment of an improved cold frame made in accordance with this invention, provided with collapsible inflatable supporting ribs secured to the ballast tube of the cold frame over which a replaceable covering is secured;

FIG. 5 is a sectional elevational view, taken along line 5—5, of the collapsible cold frame of FIG. 4;

FIG. 6 is a plan view of another embodiment of an improved collapsible cold frame incorporating the present invention wherein the ballast tube is substantially rectangular in contour and is provided with a covering member supported by a pair of spaced rigid pegs;

FIG. 7 is a sectional elevational view, taken along line 7—7 of FIG. 6, showing the arrangement of the spaced pegs removable covering member and ballast tube of this construction;

FIG. 8 is a perspective view, partly broken away, of another embodiment of the improved collapsible cold frame made in accordance with the present invention wherein a removable covering member is supported by collapsible inflatable V-shaped ribs secured to spaced ballast tubes;

Figure 10:
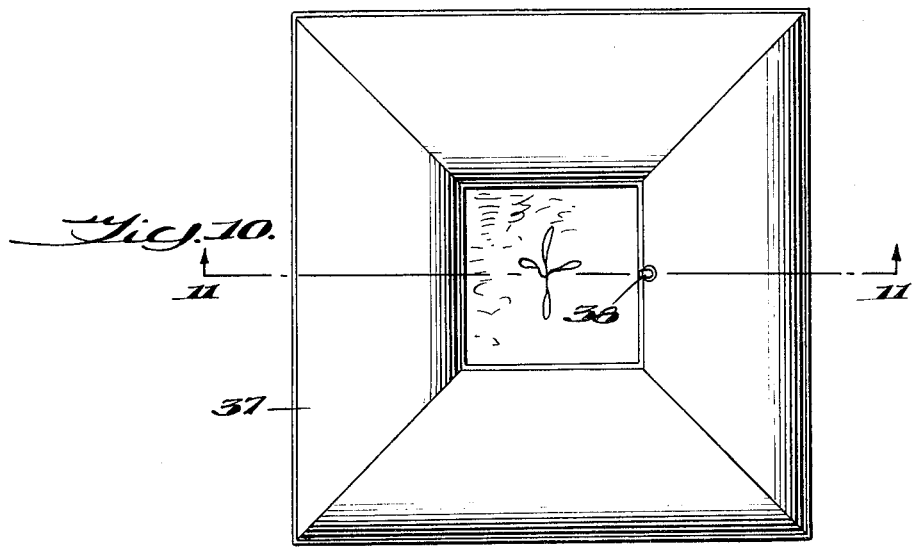
Figure 11:
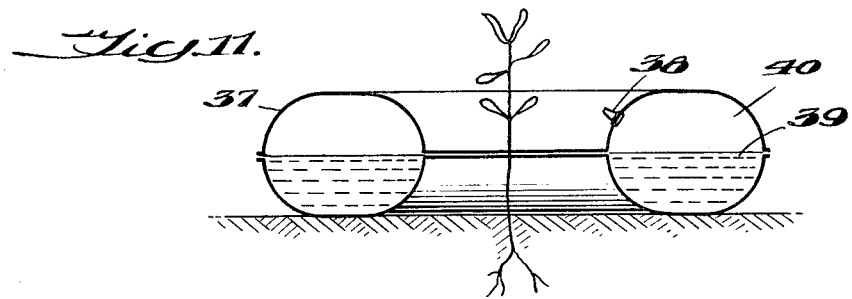
Figure 12:
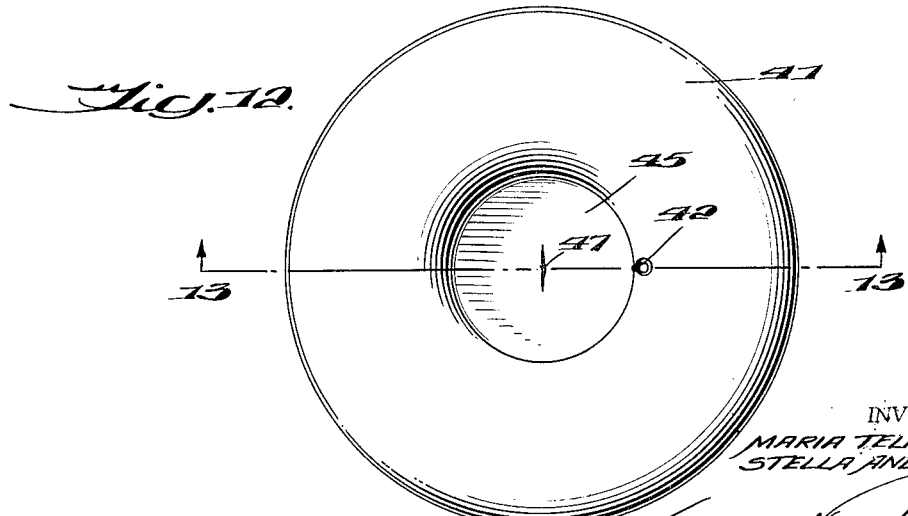

FIG. 8A is a sectional view taken in a plane, as shown in dotted lines, at right angles to the end faces 31 in FIGS. 8 and 9 viewed in the direction of the arrows 8A and illustrates the manner in which the covering is fastened in position by a drawstring to the water-filled tube 26 or 32;

FIG. 8B is a sectional view taken along a plane, shown in dotted lines, at right angles to the axial direction of the tubes 26 and 32 in FIGS. 8 and 9, respectively, viewed in the direction of the arrows 8B and illustrates the arrangement of the covering and the drawstring at this part of the collapsible cold frame structure;

FIG. 9 is a perspective view illustrating another embodiment of the present invention similar to that shown in FIG. 8, wherein the collapsible inflatable ribs are in the form of curved or arcuate ribs;

FIG. 10 is a plan view of another embodiment of the present collapsible cold frame invention wherein the ballast tube is shown as substantially rectangular in shape;

FIG. 11 is a sectional elevational view of the collapsible cold frame shown in FIG. 10, taken along line 11—11 of this figure;

FIG. 12 is a plan view of a collapsible cold frame incorporating the present invention having a substantially toroidal ballast tube with a covering member formed integrally with the tube;

FIG. 13 is a sectional elevational view, taken along line 13—13 of FIG. 12, on a smaller scale, showing the general manner in which a plant is adapted to grow through a collapsible cold frame of this type;

FIG. 14 is a sectional elevational view showing the collapsible cold frame of FIG. 13 provided with an additional removable covering member in the general form of a tent or enclosure;

FIG. 15 is a perspective view, partly broken away and partly in section, of a further embodiment of the present invention wherein a plurality of longitudinally extending spaced ballast tubes are shown integrally connected by growing-space covering members to form a blanket type cold frame or sun mulch particularly adapted for the initial propagation of crops in situ;

FIG. 16 is a fragmentary plan view of another embodiment of this invention wherein a cold frame or sun mulch is provided in the form of an inflatable, collapsible blanket formed of substantially transparent material adapted to be inflated partially with water and partially with air and having a plurality of transversely and longitudinally aligned apertures through which plants can grow;

FIG. 17 is a sectional view taken along line 17—17 of FIG. 16 illustrating the relative arrangement of water and air in the cold frame and the manner in which plants can grow through the apertures in the blanket;

FIG. 18 is a fragmentary plan view of a further modification of a blanket type cold frame or sun mulch wherein the blanket is provided with a ballast tube extending completely around the periphery thereof and adapted to be inflated substantially entirely with water while the central portion of the blanket is adapted to be inflated either entirely with air or partially with air and partially with water and wherein apertures through which plants can grow are formed in longitudinally extending, non-inflatable ribs or strips which are raised above the surface of the ground and extend between inflated portions of the blanket;

FIG. 19 is a sectional view taken along line 19—19 of FIG. 18 showing the relative inflated arrangement of the various sections of the blanket cold frame or sun mulch illustrated in FIG. 18;

FIG. 20 is a plan view, partly broken away, illustrating a further embodiment of a simplified collapsible, inflatable sun mulch made in accordance with this invention;

FIG. 21 is a vertical sectional view through a pair of sun mulches of the type shown in FIG. 20 applied along a row of plants;

FIG. 22 is a perspective view of an individual plant collapsible cold frame or sun mulch made in accordance with this invention with a water-inflatable ballast tube around one edge thereof and open at the other end with a drawstring for closing the open upper end of the cold frame;

FIG. 23 is a perspective view of the cold frame shown in FIG. 22 illustrating the device with the drawstring drawn so as to close the upper end of the cold frame;

FIG. 24 is a plan view illustrating the development of the cold frame shown in FIGS. 22 and 23, prior to final assembly of the material of which it is formed; and FIG. 25 is an enlarged fragmentary view of the ballast tube end of the cold frame shown in FIGS. 22 and 23, partially in section, illustrating details of this feature.

Referring to the drawings, an improved collapsible cold frame is illustrated in FIGS. 1 and 2 which is particularly useful for the propagation of seedlings or for the propagation of plants in a small bed. The illustrated cold frame is generally circular in contour and comprises a frame in the form of a ballast tube 1 which is very similar in appearance to an automobile tire innertube. This tube preferably is made of a transparent plastic which is highly transmissive of light and short wave infrared radiation and is provided with a suitable shut-off valve 2 through which water and air may be passed for the inflation of the ballast tube. For normal usage the ballast tube should be inflated, at least in part, with water 3, and, preferably, also partially inflated with air 4. The water and air both are fairly highly transmissive of light and short wave infrared radiation, and the water is highly absorptive of longer wave heat radiation, so that, on a sunny day, light and heat will be passed through the ballast tube to the soil within the cold frame and during colder portions of the day and night heat which is reradiated from the earth will tend to be confined within the cold frame and be absorbed by the water 3. The warmed water also will tend to maintain the earth below the ballast tube and within the cold frame at a higher temperature than ambient. In addition, the air 4 in the ballast tube will form an insulating layer which will minimize the radiation and conduction of heat out of the upper portion of the ballast tube.

In order further to moderate the temperatures within the cold frame, including the area of the earth surrounded by the ballast tube, this embodiment of the improved collapsible cold frame or sun mulch may be provided with a collapsible or foldable member 5 in the form of a sheet which is adapted to extend between the sides of the ballast tube 1 and substantially cover the space surrounded by the ballast tube. This sheet member 5 preferably is formed of a light and infrared radiation transmissive material, such as transparent plastic, where the frame is adapted to be used for the propagation of seedlings. A cold frame of this type also can be advantageously used for the stimulation of growth and the protection of plants which have been transplanted. For such use, it generally will be desirable to provide a covering member 5 which is translucent or opaque, at least for a short period after the transplanting has been done.

The covering sheet member 5 preferably is secured in position by an elastic band or a drawstring 6 which extends through a casing 7, which may conveniently be formed by turning in the outer edge of the covering sheet member 5 and fastening it, as shown in FIG. 3, by means of adhesive or other suitable means. The covering member should be of a size so that it will fit snugly over the ballast tube 1 and preferably be drawn taut over the space surrounded by the ballast tube, as shown in FIG. 2, with the draw means extending on the side of the major dimension or diameter of the ballast tube away from the covering member for removably securing the covering member to the ballast tube.

Where the dimensions of the ballast tube are such that there is a possibility that precipitation, such as snow, hail, or rain, on the covering member may tend to cause it to sag and thereby possibly damage plants growing within the cold frame, it will generally be found desirable to provide one or more supports for the covering member 5 intermediate the sides of the ballast tube. Such a support is shown in FIGS. 1 and 2 in the form of a small peg 8. The peg 8 preferably is provided with a rounded head 9 for contact with the underside of the covering member 5 so as to minimize the possibility of cutting or tearing of the covering member by engagement with the peg, if it becomes weighted down with material, such as rain water or snow.

This construction provides a convenient arrangement for propagating and protecting seedlings and subsequently removing the covering member 5 to allow further growth. It also is useful for the initial protection of small transplants, particularly during the first few days following their transplanting.

FIGS. 4 and 5 illustrate another embodiment of the present invention, wherein a cold frame or sun mulch, of generally circular configuration, is illustrated as provided with a collapsible ballast tube 10 preferably formed of a material, such as plastic, which is highly transmissive of light and short wave infrared radiation and highly absorptive of long wave heat radiations for the reasons previously given. This ballast tube is provided with a suitable valve 11 for inflating the tube with water 12, and, in some instances, it may be found desirable to inflate the ballast tube only partially with water and partially with air, as the water will absorb heat during the warmer portions of the day and serve as a heat reservoir for the liberation of heat during the cooler portions of the day. If the ballast tube 10 is partially inflated with air, the air space will act as an insulator above the water in the ballast tube and minimize the dissipation of heat from the water to the atmosphere above the tube, thus increasing the efficiency of the heat storage system provided by such a construction.

In many instances, it will be found desirable to use cold frames with plants which tend to grow higher than the height or diameter of the inflated ballast tube 10, and provision should therefore be made to allow the free growth of plants beyond this height. In the embodiment shown in FIGS. 4 and 5, one side of the ballast tube 10 is adapted to rest upon a supporting surface, such as the ground 13, and collapsible air-inflatable ribs 14 are secured at one end thereof to the surface of the ballast tube 10 away from the ground engaging side thereof and extend upwardly away therefrom with the other ends of the ribs 14 secured together in intercommunicating relationship, as shown at 15, forming an arched support over the space encompassed by the ballast tube 10.

As in the previously described cold frame, a foldable covering member 16, formed of suitable sheet material such as plastic, preferably is provided and arranged over the inflated supporting ribs 14 so as to extend over the ground surface within the ballast tube 10. This covering member 16 may conveniently be secured in position by extending its edges downwardly over the major dimension or diameter of the ballast tube with an elastic drawband or drawstring 17, suitably retained in a casing formed along the edges of the covering member 16, in the same manner as shown in FIG. 3. Thus, the covering member 16 can readily be placed over the inflated ribs 14 and ballast tube 10 and be held in position by the draw means 17. In order to facilitate storing and assembly of this collapsible cold frame, the inflatable ribs 14 preferably are provided with an air valve 18 which may conveniently communicate with all of the ribs 14 by being located in the common point of communication 15 at the end of these ribs. Preferably the covering member 16 is formed with a small central opening through which the valve 18 extends when the covering member is placed in position over the ballast tube. This arrangement not only minimizes the possibility of damage to the covering member by the valve 18 but also conveniently provides a means for properly centering the covering member as it is being assembled on the ballast tube. This construction of a collapsible cold frame has an added advantage in that after plants have grown to a suitable size and the weather permits the complete removal of the covering member 16 from the cold frame, the inflatable ribs 14 act as wickets for further protecting the plants. As has previously been explained, the covering member 16 can be either light and short wave infrared transmissive or may be opaque or translucent, depending upon the use to which the cold frame is put.

During certain ambient conditions and for certain types of plants it may be found desirable not to remove the entire cover member 16 for ventilation, and yet some ventilation may be needed. To provide for such a need, the cover member 16 may be formed with one or more readily openable and closable ventilating flaps or closures 16'. Such flaps can be closed in any suitable manner, as by a plastic zipper 16", so that when a zipper is opened, the flap can simply be folded back on the cover, as along dotted line 17', to provide the desired opening.

The ribs 14 of the embodiment illustrated in FIGS. 4 and 5 may also be made separate from the ballast tube 10 and either comprise an independent frame member which rests on the ballast tube 10 and is held in place by the cover member 16 or be attached in any suitable manner to the cover member 16, as adhesively secured to the underside thereof. Also, the ribs 14 could be formed of any material having sufficient rigidity to support the cover member during inclement or windy weather, and they might take the form of channel elements which would provide the desired support without the need of being inflatable.

Another embodiment of the present invention is illustrated in FIGS. 6 and 7, which show the versatility and adaptability of this invention to various uses and to different design configurations for different types of plants and different types of propagating areas. This embodiment partakes of the features of the species of this invention illustrated in both of the foregoing species. In this construction, a collapsible ballast tube 19 of substantially rectangular overall contours is conveniently formed of any suitable material, such as plastic which is light and short wave infrared transmissive and highly absorptive to long wave heat radiations.

As in the other embodiments, the ballast tube 19 is of substantially circular cross section when inflated and is adapted to be inflated with water through a valve 20 so as to substantially fill the tube. This water filling weights the structure, so that it is not readily blown away by wind and remains substantially in the same position in which it is placed upon a supporting ground surface 21. Also, the ballast tube preferably is inflated partially with air, so that the water in the tube will absorb heat during the warmer parts of the day and liberate this heat to equalize the temperature of the ground encompassed by the tube and the air enclosed within the cold frame during the colder portions of the day, while the air within the tube acts as an insulator to minimize the dissipation of heat from the ballast tube upwardly into the atmosphere.

With a cold frame or sun mulch of a larger size, such as that shown in FIGS. 6 and 7, it will usually be found necessary to cover the space between the sides of the ballast tube which forms the frame of the cold frame in order to maintain the desired temperature of the air and ground encompassed by the cold frame. This covering can readily be obtained by providing a suitable sheet member 22 of suitable contour to extend over the space between the sides of the ballast tube 19, with the edges of the covering member extending around the outside of the tube beyond the major dimensions of the tube and drawn tightly to a dimension smaller than this major dimension. This latter feature may conveniently be obtained, as in the previously described embodiments, by providing a suitable elastic drawband or drawstring 23 arranged within a casing formed along the edges of the covering member 22.

In most instances, it will be found desirable to provide additional intermediate supports for the covering member 22 in order to prevent sagging thereof under the weight of precipitation which might accumulate thereon. Such a support may conveniently take the form of pegs 24 which are driven into the ground 21 to the desired depth, and are preferably formed with rounded heads 25 for engagement with the underside of the covering member 22. Depending upon the type of plants to be propagated within the cold frame, the pegs 24 may extend upwardly from the ground 21 a distance substantially equal to the cross-sectional diameter of the ballast tube 19 or to a greater height. If the pegs extend to a greater height than the tube, the surface of the covering member 22 slopes outwardly downwardly and readily sheds precipitation thereon.

Furthermore, where the cold frame has a rectangular overall configuration, it usually will be found desirable to provide a plurality of covering supports 24. Generally, the covering member 22 may be made of material which is light and short wave infrared transmissive or for special purposes may be opaque or translucent, as has previously been explained. This type of cold frame also has the advantage that, as the plants within the cold frame grow, different heights of covering supports may be used with suitably sized covering sheets to provide for covering the plants without hampering their growth. As in the other embodiments, the covering member may be permanently removed from the cold frame when the plants are sufficiently grown and danger of damage by excessive cold or the elements no longer exists.

FIG. 8 illustrates another embodiment of an improved cold frame made in accordance with this invention particularly adapted for use in propagating plants in rows. In this construction, the cold frame is relatively narrow and long, and is outlined along its longitudinal sides by a pair of collapsible ballast tubes 26 which are connected together by a plurality of substantially V-shaped collapsible air-inflatable ribs 27. These ribs are secured at opposite ends thereof to the two ballast tubes 26 along the surface of each tube opposite the surface of the tube which is adapted to rest on the ground. In this arrangement, the ballast tubes 26 are adapted to be inflated with water through suitable valves 28 to provide them with a desired deformable rigidity for substantially defining the perimeter of the cold frame and provide for conforming of the cold frame to the contours of the ground on which it is supported.

The two ballast tubes 26 are adapted to be placed upon the ground spaced apart a distance sufficient to bridge the row of plants to be propagated within the cold frame or to extend in troughs along the sides of a hill in which the plants or seeds are planted. The space between the ballast tubes 26 is adapted to be enclosed by a covering member 29 formed of any suitable sheet material, such as plastic which may be transparent, opaque, or translucent, depending upon the condition of the plants within the cold frame, as has been previously explained. In this embodiment, the covering member 29 is supported in upwardly spaced relationship above the ground surface within the cold frame by the ribs 27, which may be inflated through any suitable valves 30. The covering member 29 may be removably secured in position over the ribs 27 and to the ballast tubes 26 by a suitable elastic drawband or a drawstring 31' arranged within a casing 30' formed along the edges of the covering member 29 and extending below the diameter of the ballast tubes 26 on the sides thereof away from the ends of the ribs 27, as shown in detail in FIGS. 8A and 8B. Such a cold frame may be made of any desired length and the ends thereof closed by end walls or sides 31 of the covering member 29.

FIG. 9 illustrates another embodiment of the present improved cold frame, similar to that shown in FIG. 8, having a pair of longitudinally extending collapsible ballast tubes 32 adapted to be inflated with water through suitable valves 33. As in the last described cold frame construction, the ballast tubes are connected together by a plurality of longitudinally spaced air-inflatable ribs 34, the ends of which are secured to the sides of the ballast tubes 32 away from the sides thereof adapted to rest upon the surface of the ground. These ribs 34 may be inflated with air through any suitable valves 35, and, when inflated, extend upwardly from the surface of the ground in the form of arches.

As in the arrangement shown in FIG. 8, a covering member 36 of suitable sheet material, such as transparent, translucent, or opaque plastic, is adapted to extend over the area between the ballast tubes and spaced from the ground surface by the inflated ribs 34. This covering member 36 may be held in position in any suitable manner, as by an elastic drawband or a drawstring arranged in a casing formed along the edges of the covering member 36 and around the lower edge of the end wall 31, which latter edge tends to be drawn inwardly slightly as shown in FIG. 8A, as in the last previously described construction, shown in enlarged detail in FIGS. 8A and 8B. This embodiment of the present invention has the added advantage that when the plants within the cold frame are sufficiently matured and the danger of damage thereto by cold and the elements no longer exists, the covering member 36 can be removed from the cold frame, and the upwardly extending ribs 34 form wickets and supports for the plants which minimize damage to the plants during further growth.

FIGS. 10 and 11 illustrate another embodiment of an improved cold frame or sun mulch made in accordance with this invention, wherein a relatively large collapsible ballast tube 37 forms the perimeter of the cold frame. In this construction, the cross-sectional area of the ballast tube is relatively large and the space between the sides of the ballast tube is relatively small, providing in effect a cold frame or sun mulch for an individual plant. The ballast tube 37 is adapted to be inflated through a suitable shut-off valve 38 and preferably partially filled with water 39 and partially filled with air 40. As in the other embodiments, the tube 37 preferably is formed of a suitable plastic which is highly transmissive of light and short wave infrared radiations and highly absorptive of long wave heat radiations. With such a construction, the water 39 tends to absorb a substantial amount of heat during the warmer parts of the day and to release heat into the ground under the ballast tube and into the air enclosed by the tube during the cooler portions of the day. The air 40 in the tube above the water 39 acts as an insulator which minimizes the dissipation of heat from the water into the ambient above the tube. Since the space encompassed by the ballast tube is relatively small, the air within the space remains substantially quiescent, so that, in most instances, it will be found unnecessary to provide a cover over this space. Generally these features of the cold frame or sun mulch will provide sufficient protection against cold damage, so that a plant may be propagated within such an individual cold framem uch earlier than would normally be possibel in an open garden area.

FIGS. 12 and 13 illustrate another embodiment of an improved cold frame or sun mulch made in accordance with this invention, which is somewhat similar to the construction shown in FIGS. 10 and 11. In this construction, the cold frame includes a frame comprising a collapsible ballast tube 41 of generally circular contour adapted to be inflated through a suitable shut-off valve 42, preferably at least partly with water 43 and preferably partly with air 44. As in the other constructions, this ballast tube 41 may be formed of any suitable material, such as plastic highly transmissive of light and short wave infrared radiations and highly absorptive of long wave heat radiations. The contours of the ballast tube 41, when inflated, define the perimeter of the cold frame or sun mulch, and the water 43 acts as a heat reservoir, while the air 44 acts as an insulator in the same manner as in the other embodiments previously described.

For certain types of plants which are highly sensitive to variations in temperature, particularly during the early stages of development, it may be found desirable to provide a light and short wave infrared transmissive member extending between and substantially covering the space between the inflatable sides of the ballast tube 41. This covering member must extend in spaced relation to the side of the ballast tube which is adapted to engage the supporting surface of the ground. In the embodiment shown in FIGS. 12 and 13, the covering member comprises a sheet 45 which is preferably formed integral with the collapsible ballast tube 41 as a disc extending substantially from the tube innermost surface of smallest diameter. This cover could extend from any other suitable point on the inner periphery of the ballast tube 41 which would provide an air space between the sheet 45 and the surface 46 of the ground enclosed by the tube 41.

With this type of cold frame, a delicate plant may be propagated and it will normally grow freely until it reaches a height corresponding to the distance between the covering sheet 45 and the ground surface 46. At this stage of development of the plant, the covering sheet 45 may be pierced or otherwise slit, as indicated at 47, to allow the plant to pass through the sheet 45. As the plant grows and becomes more hardy, such that damage from low ambient temperature and the elements no longer exists, the entire sheet 45 may be cut away from the ballast tube. In some instances, it may be found sufficient merely to make the opening at the point 47 sufficiently large to accommodate the natural growth of the plant, as illustrated in FIG. 13.

FIG. 14 illustrates a modification of the structure of FIGS. 12 and 13 which provides a very practical individual plant greenhouse. According to this embodiment, plants grown in a cold frame of the FIGS. 12 and 13 type may be protected against sudden and unexpected injurious weather by arranging an enclosing tent or canopy 48 over the entire cold frame. This tent or canopy preferably is made of relatively stiff material, which, after being shaped, will retain its desired configuration even when subjected to wide variations in ambient temperature or when subjected to various types of precipitation.

The tent 48 may have any suitable configuration and generally will be closed at the upper end so as to maintain a quiescent state of air within the tent which not only protects the plant against the wind but also tends to minimize the dissipation of heat from within the tent to the ambient. The material of which the tent is made also preferably is light and short wave infrared radiation transmissive so that these radiations can readily reach a plant within the cold frame. The lower end of the tent 48 is left open and is adapted to secure the tent in position over the cold frame. It preferably is formed with a casing 49 along the edge thereof in which a suitable elastic drawband or drawstring is arranged for fastening the open end of the tent 48 around the ballast tube 41 on the side of the major dimension of the tube away from the covering tent member 48 for removably securing these together.

The present invention is also adaptable for use in large scale gardening or farming activities wherein relatively long rows of plants may be considerably advanced in their growing season by the use of a cold frame or sun mulch having a configuration particularly adaptable for such a use. FIG. 15 illustrates an embodiment of such a sun mulch in the form of a blanket which may be laid over the cultivated soil in which seeds or plants have or are to be planted. As shown in this figure, the cold frame or sun mulch includes a frame comprising a plurality of longitudinally extending spaced collapsible ballast tubes 50, which are adapted to be inflated preferably at least in part with water 51 and in part with air 52. This inflation may conveniently be done after the blanket has been placed over the surface of the soil and both the water and air injected into the ballast tubes 50 through suitable shut-off valves 53.

In the preferred embodiment of this structure, the blanket is formed of two sheets of suitable material, such as transparent plastic which is highly transmissive of light and short wave infrared radiation, and these two sheets of plastic are sealed together along longitudinally extending transversely spaced strips 54 of predetermined width and spacing, so as to provide ballast tubes 50 which are spaced the desired distance apart by the sealing strips 54. With this arrangement, the strips 54 will be spaced between the ballast tubes 50 and also spaced upwardly from the surface of the ground 55 which supports the ballast tubes, leaving a ground space between the ballast tubes in which plants may be readily propagated. Seeds may be planted in rows corresponding to the strips 54 and the cold frame arranged over the ground in such a manner that the strips 54 extend over the rows of planted seeds, or, alternately, the strips 50 may be provided with longitudinally spaced openings 56 through which seeds or plants may be planted in the soil beneath these openings. Where the seeds are planted in the soil under the strips 54, it has been found that the ballast tubes 50 very effectively prevent the growth of weeds, while the seeds readily grow in the space between the ballast tubes and out through the openings 56 in the strips 54. The inflated ballast tubes act to maintain the heat under the cold frame at a substantially higher temperature than ambient, while the covering strips 54 collect moisture evaporated from the soil as condensate thereon, and this flows back into the soil, so that these combine to greatly stimulate the growth of plants propagated with this type of cold frame.

FIGS. 16 and 17 illustrate another type of cold frame or sun mulch in the form of a blanket, somewhat similar to the embodiment illustrated in FIG. 15. In this embodiment, the collapsible sun mulch comprises a blanket of collapsible material adapted to be inflated at least in part with water and preferably in part with air. The blanket is preferably formed of two sheets of material 57 and 58, highly transmissive of light and short wave infrared radiations, such as a suitable transparent plastic. The outer edges 59 of these sheets 57 and 58 are sealed together in any suitable manner as by adhesive or heat, and a plurality of longitudinally spaced and transversely spaced rows of apertures 60 are formed through the blanket, with the edges 61 of the two sheets 57 and 58 around the aperture 60 also securely sealed together in any suitable manner, as by adhesive or heat, to prevent leakage of inflating medium out of the blanket. A suitable shut-off valve 62 extends through one of the sheets of the blanket to provide for inflation and deflation of the blanket with water and also, if desired, partly with air.

As shown in these figures, such a sun mulch blanket is substantially wider and longer than the depth of the blanket when it is inflated, and substantially all of the surface of the ground is covered by the inflated portion of the blanket except those portions directly under the apertures 60. Seeds or plants can be readily planted in the soil through the apertures 60 so that the plants can grow out of the soil and through these apertures. It has been found that this type of blanket maintains the soil under the blanket at an appreciably higher temperature than ambient, and that the configuration of the blanket around the apertures 60 aids in preventing the evaporation of moisture from the soil and also provides for funneling precipitation through the apertures 60 to the soil thereunder. These features greatly assist in stimulating early growth of plants and provide a protection for young plants against damage by unexpected cold and the elements during the early stages of propagation.

FIGS. 18 and 19 illustrate another embodiment of an improved cold frame or sun mulch of the blanket type made in accordance with the present invention. In this construction, the sun mulch comprises an inflatable blanket 10 formed of two substantially parallel layers or sheets of material highly transmissive of light and short wave infrared radiation. The blanket is provided around all of the edges thereof with an inflatable section 63 which is sealed from the central portion of the blanket and forms a ballast tube frame defining the perimeter of the sun mulch. The sealing of the central portion of the blanket from the ballast tube section 63 is conveniently formed by longitudinally and transversely extending strips 64, which adhesively secure the top and bottom layers of the blanket against leakage of inflating medium from the ballast tube section 63 into the central portion of the blanket. A suitable shut-off valve 65 is provided for inflating the ballast tube 63 with water. In most instances it will be found desirable simply to use water as the inflating medium, so as to form a relatively heavy anchoring element extending completely around the perimeter of the blanket for preventing displacement of the blanket by even relatively high winds.

The central portion of the blanket is formed with a plurality of transversely spaced longitudinally extending strips 66 of an appreciable predetermined width which seal together the top and bottom layers of the blanket. These sealed strips 66 perferably do not extend the full length of the blanket, thereby providing open spaces around the ends of the strips 66 so that there is communication between all of the longitudinally extending tubular portions or rows 67 formed between these strips. Longitudinally spaced apertures 68 are formed in the strips 66 and are completely sealed around the edges thereof by the strips, so as to prevent leakage of inflating medium out of the blanket through the apertures.

Since all of the inflatable portions 68 are in communication at the outer ends of the blanket, a single shut-off valve 69 provides for the inflation and deflation of all of the central portions of the blanket. The central portion of the blanket may be inflated only with air; however, it is preferable to inflate the central portion at least in part with water, as shown at 70 (FIG. 19), and partially with air, as shown at 71. With such a construction the water in the ballast tube 63 and the water 70 in the central portion of the blanket act as a heat reservoir and maintain the temperature of the soil at a substantially higher temperature than ambient, while the air 71 acts as an insulator which minimizes the dissipation of heat from the soil through the blanket. Such a blanket very effectively minimizes and substantially prevents the growth of weeds under the blanket while greatly stimulating the growth of plants through the apertures 67.

A very versatile improved sun mulch made in accordance with this invention is illustrated in FIGS. 20 and 21. This sun mulch may conveniently be formed of a single sheet of plastic which is light and short wave infrared radiation transmissive and which is folded over to form top and bottom layers 71 and 72 which are sealed along the edges 73 and 74 in any suitable manner, as by adhesive or hot pressing to form a closed tube. This tubular collapsible sun mulch may be made of any desired length and of a width generally corresponding to a trough between hills in which plants are grown, as is more clearly shown in FIG. 21. In order to obtain the maximum efficiency of this sun mulch as means for moderating the heat in the soil, it is preferably inflated at least in part with water 75 and in part with air 76. Both the air and water may be supplied to the tube for inflating it and withdrawn from the tube for deflating it by a single suitable shut-off valve 77. In most instances, it will be found desirable to provide a tube which is substantially longer and wider than the depth of the tube when it is inflated with water and air. This not only provides a more practical size of sun mulch but also increases the relative area of contact between the tube and the soil compared to the total cross-sectional area of the tube and provides for more securely anchoring the tube in position by the weight of the water 75 in the tube.

For certain types of plants, such as strawberry plants, pairs of long tubular sun mulches of this type can be advantageously fastened together at intervals in any suitable tie members, as by simple open rings or tied by ribbons, to form a series of connected circular protective propagating tubes. A separate circular form of this type could be used for each plant in a row. Such tubes would probably be of relatively smaller width than shown in FIGS. 20 and 21, as a tube of adjacent pairs would be placed immediately next to another such tube between rows of plants.

In order to increase the usefulness of this type of sun mulch, a plurality of fluid dams comprising internal walls 78 of collapsible material preferably are provided and arranged so as to extend between the top and bottom layers of plastic forming the tube. These walls extend transversely partly across the tube and angularly relative to the length thereof, with alternate walls being joined to and extending from opposite sides of the tube, whereby pockets 79 are alternately formed on such opposite sides of the tube. This feature of the sun mulch is particularly useful where it is to be used on land which has a slight slope or grade, as it prevents the water in the tube from flowing entirely to the lower end of the tube and the air accumulating entirely in the higher end of the tube. The pockets 79 which are alternately distributed in spaced relationship longitudinally of the tube provide for the collection of water in each of these pockets so that the water is fairly evenly distributed throughout the length of the tube. Care must be taken in using this type of sun mulch on sloping land to assure that the pockets in the tube slope inwardly upwardly, as otherwise they would not serve to hold water therein. These water pockets 79 also are useful in preventing the drainage of water from the entire ballast tube should it become punctured. The ballast tubes can be very easily deflated and emptied of water by reversing the general direction in which the tubes are laid upon the sloping ground when in use, so that the water tends to flow out of the pockets 79 towards the end of the tube where the valve 77 is located. For storage purposes, these tubes can very easily be rolled up after being emptied of water and air.

A very practical cold frame or sun mulch can be constructed in accordance with this invention as an individual plant greenhouse, which can be easily stored in a minimum of space and assembled wherever desired to stimulate the growth of a plant and to protect it from injurious effects of unfavorable climatic conditions. Such an embodiment of the present invention is illustrated in FIGS. 22–25. As shown in FIG. 24, the collapsible cold frame can be made from a single piece of suitable sheet material, such as plastic which may be transparent to light and short wave infrared radiations, or for certain purposes may be translucent or opaque. This single sheet preferably has both of the edges along the longitudinal sides of the material turned in and suitably secured as by adhesive or heat sealed so as to form a loop or casing along both of these edges. The loop or casing 79 along one of these edges is relatively narrow, so as to form a casing for a drawstring 80, which is secured at its ends to one or both ends of the casing 79. The casing along the longitudinal edge of the material opposite the casing 79 preferably is substantially wider and forms an inflatable ballast tube 81 which is sealed at both ends 82 and 83 of the sheet. This ballast tube is adapted to be inflated with water so as to form a weight along the lower edge of the cold frame after it has been completely assembled and set up. Preferably a shut-off valve 84 is provided for admitting water into the ballast tube portion of the cold frame and draining it therefrom.

While the cold frame may take any desired cross-sectional configuration, in most instances it will be found more practical to have a substantially cylindrical unit. This can readily be obtained by sealing together, in any suitable manner, the opposite transverse edges 84 and 85 of the sheet material, so as to form an endless band or collar 86. As shown in FIG. 22, the endless band 86 may be erected in an upright position as a hollow substantially cylindrical container around an individual plant with the ballast tube 81 at its lower end. The ballast tube 81 is adapted to be inflated with a suitable amount of water so as to weight or anchor the lower end of the collar 86 to the ground to prevent its being blown away by wind and will be found adequate for this purpose for all normal weather conditions. If the weather is relatively cool or if the elements might tend to injure the plant, the drawstring 80 in the casing 79 around the upper end of the collar 86 can be drawn so as to close the top of the collar as shown in FIG. 23 and protect the plant from the elements. The drawstring 80 can be twisted or otherwise secured so as to prevent accidental opening of the upper end of the collar.

In the closed top condition of the collar 86, as shown in FIG. 23, a very useful tent is provided for protecting seedlings or transplants during the initial stages of propagation or for a short period after transplanting. A translucent or opaque tent of this type can be very useful in protecting transplants from the injurious effects of the sun for several days after transplanting. When a transplant has reestablished its root system or a plant has sufficiently matured and the elements are not such as would cause injury to the plant, the drawstring 80 can be released and the upper end of the collar 86 completely opened, as shown in FIG. 22, to permit free passage of sunlight and circulation of air. The closed condition of the collar 86, as shown in FIG. 23, also can be very useful in protecting a plant against late frost in the spring and early frost in the fall. This type of cold frame also provides all of the previously described advantages of maintaining the soil around the plant at a temperature higher than ambient and of conserving the moisture in the soil by minimizing its evaporation and by providing for condensation of moisture evaporated from the soil on the inner sides of the collar so that the moisture is returned to the soil and prevented from escaping to the atmosphere.

In general, the illustrated covering members are shown as readily demountably supported on the ballast tubes and frames, but it should be understood that such covering members could be permanently secured to the respective supporting members if desired. Also, the covering members can be formed with readily openable and closable flaps, which can be similar to that shown in FIGS. 4 and 5, to provide for ventilation if desired.

While particular embodiments of this invention have been illustrated and described, modifications thereof will occur to those skilled in the art. It is to be understood, therefore, that this invention is not to be limited to the particular arrangements and structures disclosed, and it is intended in the appended claims to cover all modifications within the spirit and scope of this invention.

What is claimed is:

A collapsible cold frame including a frame comprising a collapsible solar heat storing and ballast tube member adapted to be filled at least in part with water for carrying out the heat storing and ballast purposes, said tube member being formed of plastic highly transmissive of light and short wave infrared radiations and highly absorptive of long wave heat radiations and having contours substantially defining spaced apart boundaries of the cold frame, a light and short wave infrared transmissive member extending between and substantially covering the space between the fillable portions of said tube member in spaced relation to the side thereof adapted to engage a supporting surface, said covering member comprising a sheet of plastic formed to extend over and around said tube member when said tube member is filled and having elastic draw means for drawing the edges of said covering member snugly around said tube member below the major dimension thereof for removably securing said covering member to said tube member, and means including collapsible air-inflatable ribs secured to said tube member and adapted to extend upwardly therefrom for forming a support for said covering member.

References Cited by the Examiner

UNITED STATES PATENTS

| | | | |
|---|---|---|---|
| 1,112,052 | 9/14 | Campbell | 47—28 |
| 1,930,939 | 10/33 | Horner | 47—9 |
| 1,964,818 | 7/34 | Hood | 47—28.1 |
| 2,028,060 | 1/36 | Gilbert | 47—28.1 |
| 2,505,845 | 5/50 | Alvarez | 47—28.1 |
| 2,691,848 | 10/54 | Arena. | |
| 2,720,725 | 10/55 | Peerless. | |
| 2,910,994 | 11/59 | Joy | 47—28.1 |

FOREIGN PATENTS

| | | |
|---|---|---|
| 68,643 | 10/92 | Germany. |
| 1,075,888 | 2/60 | Germany. |

ANTONIO F. GUIDA, *Primary Examiner.*

T. GRAHAM CRAVER, A. JOSEPH GOLDBERG, *Examiners.*